United States Patent [19]

Davidov et al.

[11] Patent Number: 4,959,862

[45] Date of Patent: Sep. 25, 1990

[54] ACTIVE MULTICHANNEL VIDEO PROCESSING HUB FOR OPTIMUM TRANSITION FROM FIBER TO COAX

[75] Inventors: Mircho A. Davidov, Danville; Kamaljit Singh, San Jose, both of Calif.

[73] Assignee: Catel Telecommunications, Inc., Fremont, Calif.

[21] Appl. No.: 187,305

[22] Filed: Apr. 28, 1988

[51] Int. Cl.⁵ ............................................. H04N 7/167
[52] U.S. Cl. ........................................... 380/10; 455/6; 358/86
[58] Field of Search ............................ 358/86; 455/3-6; 370/1, 3, 4, 11, 73; 375/62, 65, 66; 332/17, 120, 145

[56] References Cited

U.S. PATENT DOCUMENTS 2,506,672  5/1950  Kell et al. ............................... 370/3
4,779,129 10/1988  Uee et al. ............................... 358/86

FOREIGN PATENT DOCUMENTS 0144770  6/1985  European Pat. Off. ............... 358/86

OTHER PUBLICATIONS

W. Horak, "TV Program Distribution Over Fiber CATV Networks"; *Proceedings of Int. Broadcasting Convention*, (London, 9/76), pp. 228-231.

B. White, "The Fibre Optic Pipedream Comes True in Video"; "Broadcasting Systems & Operation"; (8/79, pp. 352-356).

*Primary Examiner*—Stephen C. Buczinski
*Assistant Examiner*—Bernarr Earl Gregory
*Attorney, Agent, or Firm*—Flehr, Hohbach, Test, Albritton & Herbert

[57] ABSTRACT

An active multichannel video processing hub which provides optinum transition from fiber to coaxial cable, provides optimum trading of bandwidth for signal to noise ratio. Fiber optic links have a very large bandwidth capability. Larger distances can be covered with fiber optic links without repeaters. This offers not only saving in maintenance, but has no radiation and offers bidirectional capabilities not easily achievable with coax-based trunks. Scrambled signals are transmitted over the fiber and converted to VSB-AM signals at the hub for transmission over the coaxial portion of the trunk. This keeps the bulky and complex headend scrambling equipment in one central location instead of spreading it over many hub locations. The inherent heterodyne processing capabilities of the hub permit it to link headends with different frequency plans. Also, the hub-based trunk does not obsolete existing equipment and method of operation.

13 Claims, 10 Drawing Sheets

ACTIVE MULTICHANNEL VIDEO PROCESSING HUB FOR OPTIMUM TRANSITION FROM FIBER TO COAX

BACKGROUND OF THE INVENTION

Limitations of Current CATV Trunk Architecture

The traditional cable television (CATV) distribution trunk is coaxial cable-based It contains a series of amplifiers placed approximately every ½ mile along the signal path. These amplifiers are needed to maintain the proper operational signal level At selected locations, the signals are tapped and further amplified to bring them to the customer premises.

In a typical CATV trunk there are 30–50 (some trunks contain as many as 60) amplifiers in a cascade. This large number of amplifiers brings about many unwanted problems, such as:

A failure in any of the cascaded amplifiers will cause the shutdown of the entire trunk.

The signal quality degrades significantly as the number of amplifiers increase In some existing trunks, the number of amplifiers is so large (60 or more) that it makes it impossible to add any more subscribers to the system.

Many older CATV trunks have frequency response limited to 300 MHz at most, and suffer from spurious radiation problems. Rebuilding to 450–550 MHz capability and curing the radiation problems can be a very costly effort, requiring replacement of the amplifiers and even the coaxial plant itself.

Role of Supertrunks in CATV Video Signal Distribution

Headends themselves are frequently connected with other remote video sources such as satellite-received signals or with other headends.

Linking headends with satellite signals or with other headends has traditionally been done with supertrunks. Because of the very high quality of the transmission required, the supertrunk is typically FDM-FM (Frequency Division Multiplexed—Frequency Modulated) based distribution system. Present day state of the art supertrunks can carry up to 16 channels per supertrunk.

Early supertrunks used coaxial cable as the transmission media. Recently, fiber optic-based supertrunks have been used to avoid the problems associated with the conventional coaxial cable-based supertrunks.

Fiber-based supertrunks not only deliver video transparently (with no system-added degradation), but they also offer the system designed with totally new system capability—the fiber offers very wide bandwidth capability, low losses, very small weight and size, no RFI (Radio Frequency Interference) or EMI (ElectroMagnetic Interference) and rapidly dropping cost. Currently, 16 channels using FDM-FM can be transmitted over 40 km of fiber with no repeaters and with very high performance - SNR (Signal to Noise Ratio) of 65 db or better. FDM-FM supertrunks have excellent video performance but have limitations, especially with non-standard video signals. If scrambled signals are transmitted over the supertrunk using FM, the demodulated baseband video will not have the sync or other suitable clamp reference signals, and this makes it virtually impossible for the following AM (Amplitude Modulation) modulator to operate properly. Thus, in the traditional CATV architecture, the supertrunk terminates in hub, where the signal is first FM demodulated and than descrambled to recover the proper sync and other missing reference signals. Following the descrambling operation, the video signal is VSB (Vestigial Side Band)-AM modulated for transmission over a CATV distribution trunk. This results in bulky multirack equipment configuration and very high cost per channel.

SUMMARY OF THE INVENTION

It is an object of the present invention to provide an improved active multichannel video processing hub for optimum transition from fiber to coaxial cable.

In one embodiment for operating in a scrambled mode, a multichannel cable television trunk is provided which includes means for amplitude modulating a baseband audio signal and a baseband video signal to form intermediate frequency (IF) video and audio signals.

The system further includes means for scrambling the IF video and audio signals to form scrambled IF video and audio signals which also include appropriate control information.

The system further includes means for mixing the scrambled intermediate frequency video and audio with a local oscillator signal to form composite video and audio subcarriers.

This aspect of the invention provides video and audio subcarriers which are insensitive to phase noise at any point where there is a frequency conversion involved and local oscillator phase noise is no longer critical.

Other objects, features and advantages of the present invention will become apparent from the following detailed description when taken in conjunction with the accompanying drawings.

DETAILED DESCRIPTION OF THE DRAWINGS

The Heart of a New CATV Distribution Trunk

Figure 1:
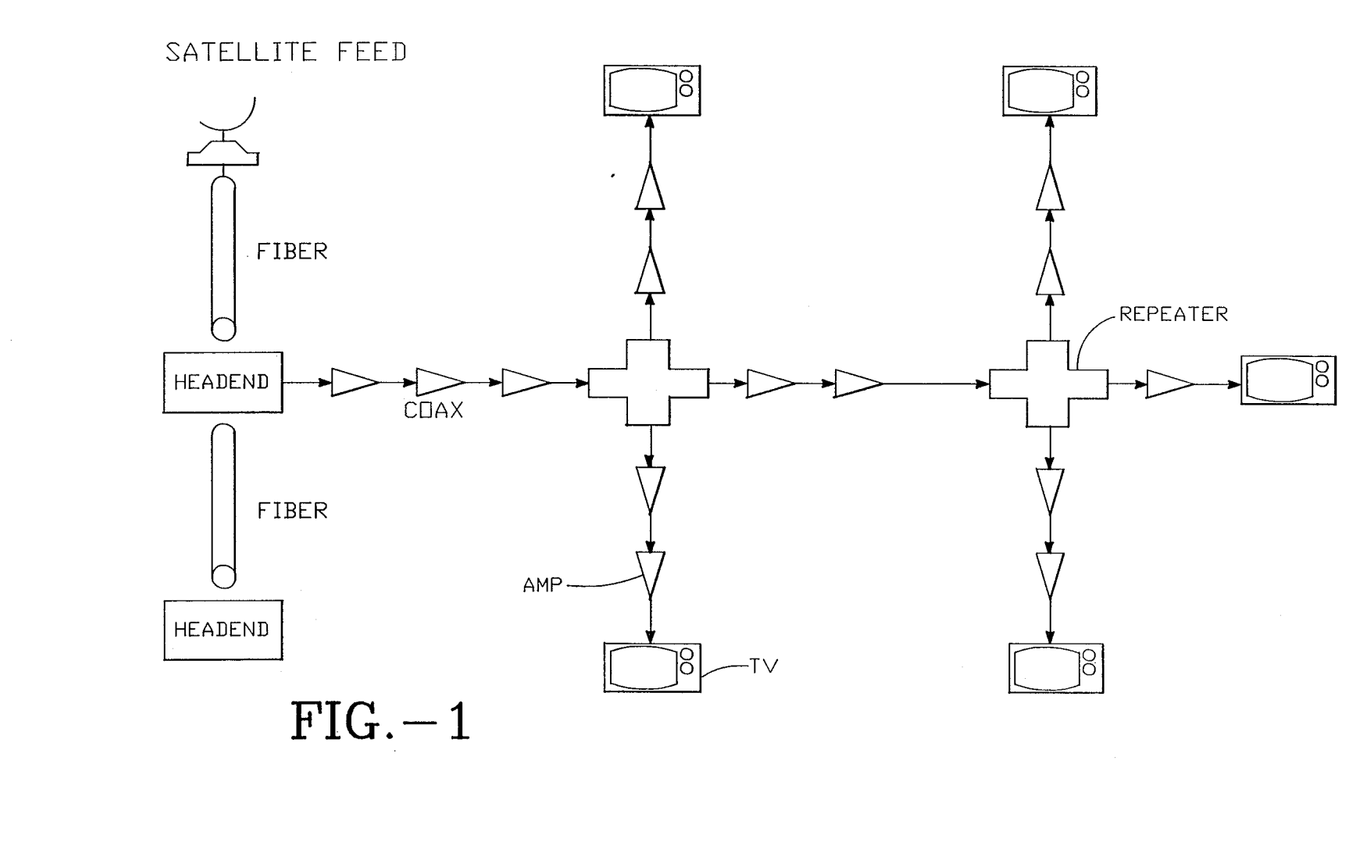
FIG. 1 depicts a diagram of a conventional cable television (CATV) trunk architecture.
Figure 2:
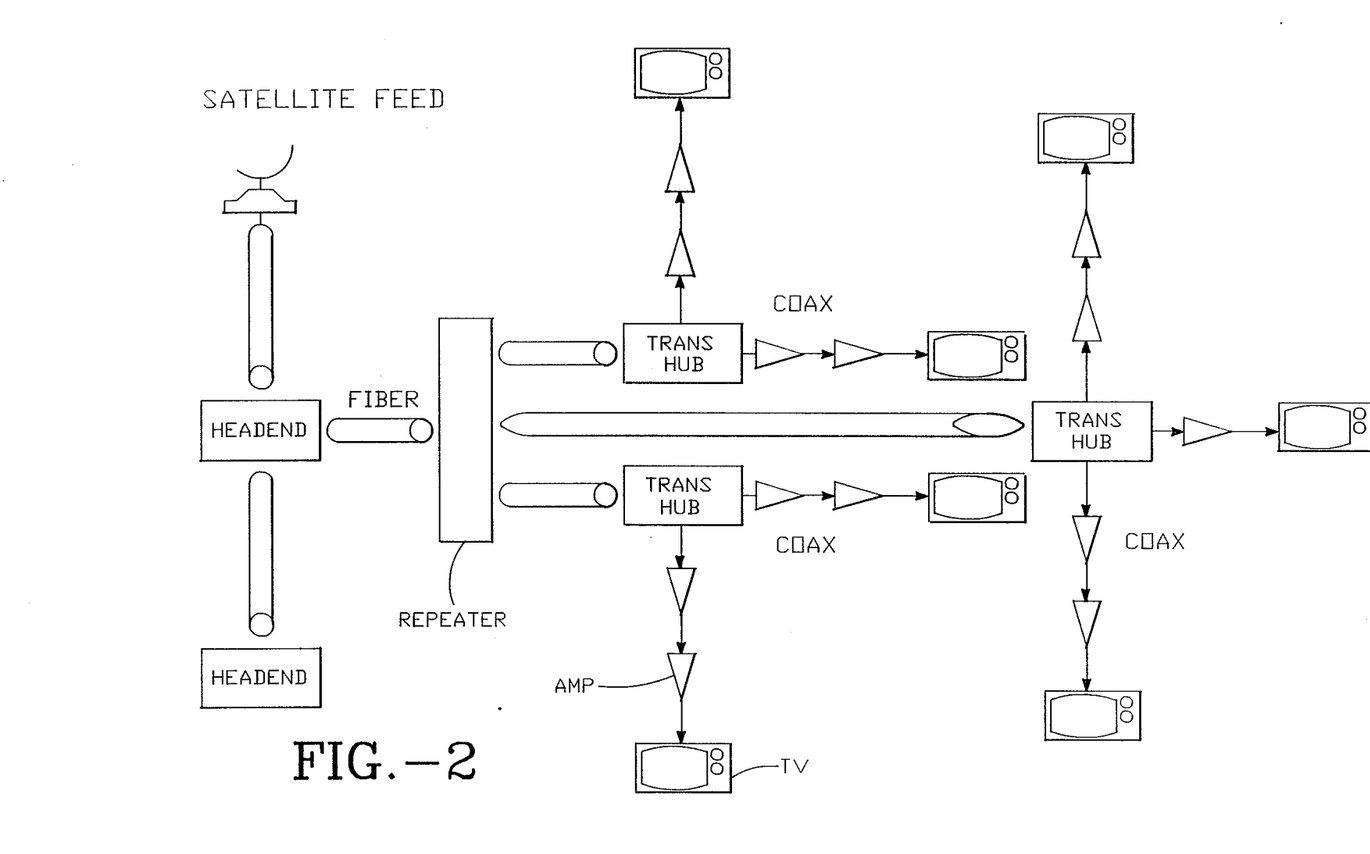
FIG. 2 depicts a diagram of an improved active multichannel video processing hub according to the present invention.

Instead of serial tree and branch signal distribution, a parallel method of signal distribution is disclosed (See FIG. 2).

From a headend, the baseband video and audio signals are FM modulated, and the multichannel signal is transmitted to a hub. At the hub, the signals are individually FM demodulated and converted to AM signals. Two methods of signal conversion are proposed, depending on whether the signals are scrambled or not.

(a) Signals are transmitted in the clear (unscrambled) mode

Figure 3A:
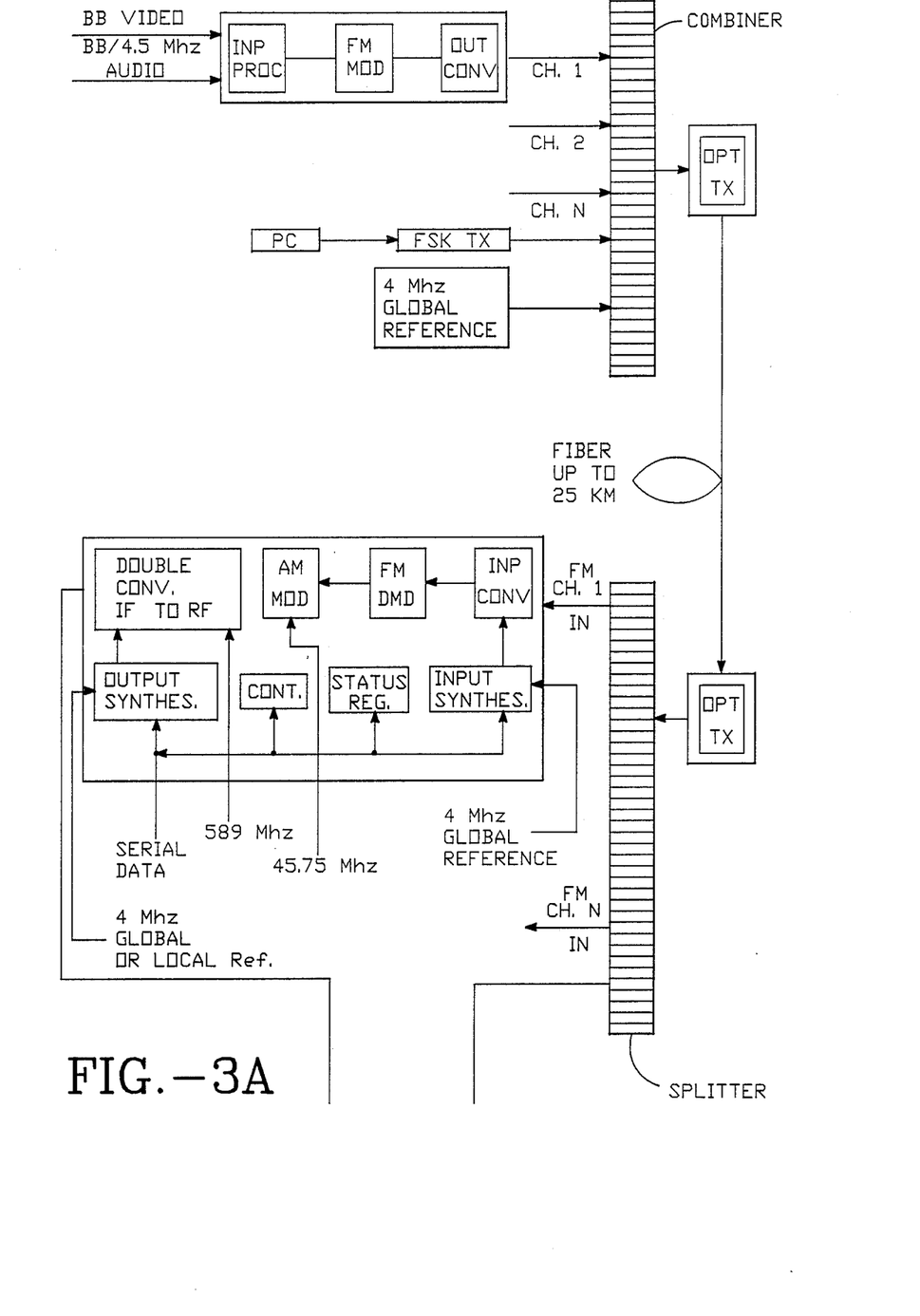
FIG. 3 depicts a block diagram of a CATV hub according to the present invention.
Figure 3B:
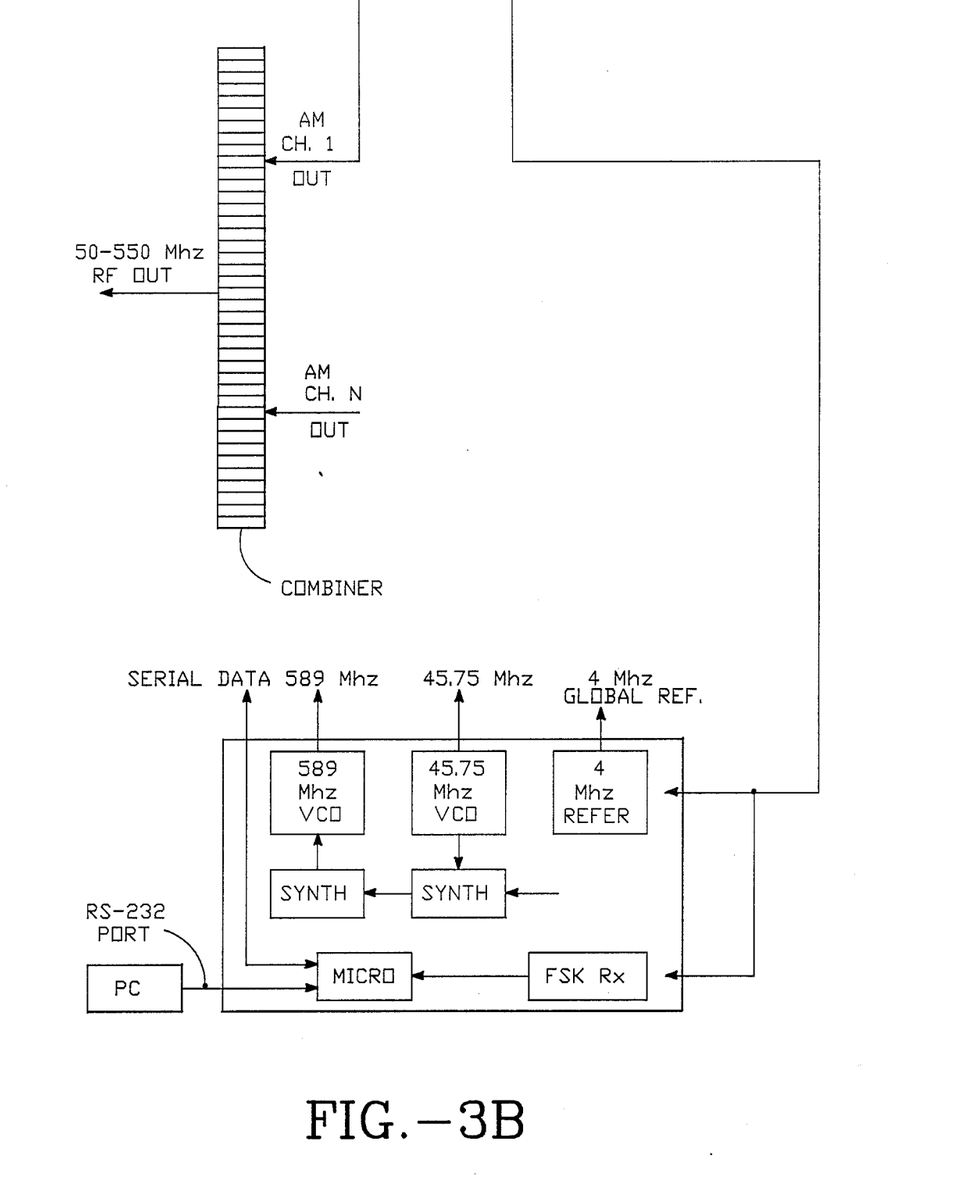

As can be seen from FIG. 3, at the headend site, the baseband video and audio signals are transmitted as conventional supertrunk input signals. The video signals are amplified and pre-emphasized in the input processor (INP PROC) module. The audio signals are FM modulated at twice the normal deviation on a 9 MHz subcarrier in an audio subcarrier modulated module. The composite baseband signal (pre-emphasized video and 9 MHz double deviation audio subcarrier) is FM modulated at an IF (Intermediate Frequency) frequency—typically 70 MHz. The IF frequency is then upconverted to an RF frequency and is combined with the other FM modulated channels to form the composite RF video signal. To this signal, a reference and a control FSK (Frequency Shift Keyed) carrier signals are added. The reference carrier signal is a lower frequency signal (typically 4 MHz) and is the global reference to which all hub carriers are locked. This FSK carrier is needed to carry any control or the channel mapping data to the Hub individual channel synthesizers or control various channel parameters such as output power, video or audio carrier levels.

The composite FM modulated RF signal occupying the frequency band of 1-550 MHz (lower limit determined solely by the frequency response of the optical portion of the system) then intensity modulates the optical transmitter (laser diode or LED). Future expansion of number of channels transmitted is handled with a block conversion of an additional bank of channels (occupying 1-550 MHz) to 600-1150 MHz frequency band. The two frequency bands are then combined for intensity modulation of the optical transmitter. This method permits incremental increase of the number of channels transmitted (limited only by the frequency response or the output power/noise floor of the optical transmitters and receivers) while maintaining full compatibility with all existing and subsequent phases of capacity expansion.

At the hub, the optical signal is received and converted to an electrical signal by an optical receiver. Then an inverse operation is performed by the Hub as shown in the block diagram on FIG. 3 and in more detail in FIG. 4. Each video carrier is selected and downconverted by an input converter to a high IF for FM demodulation.

Figure 4:
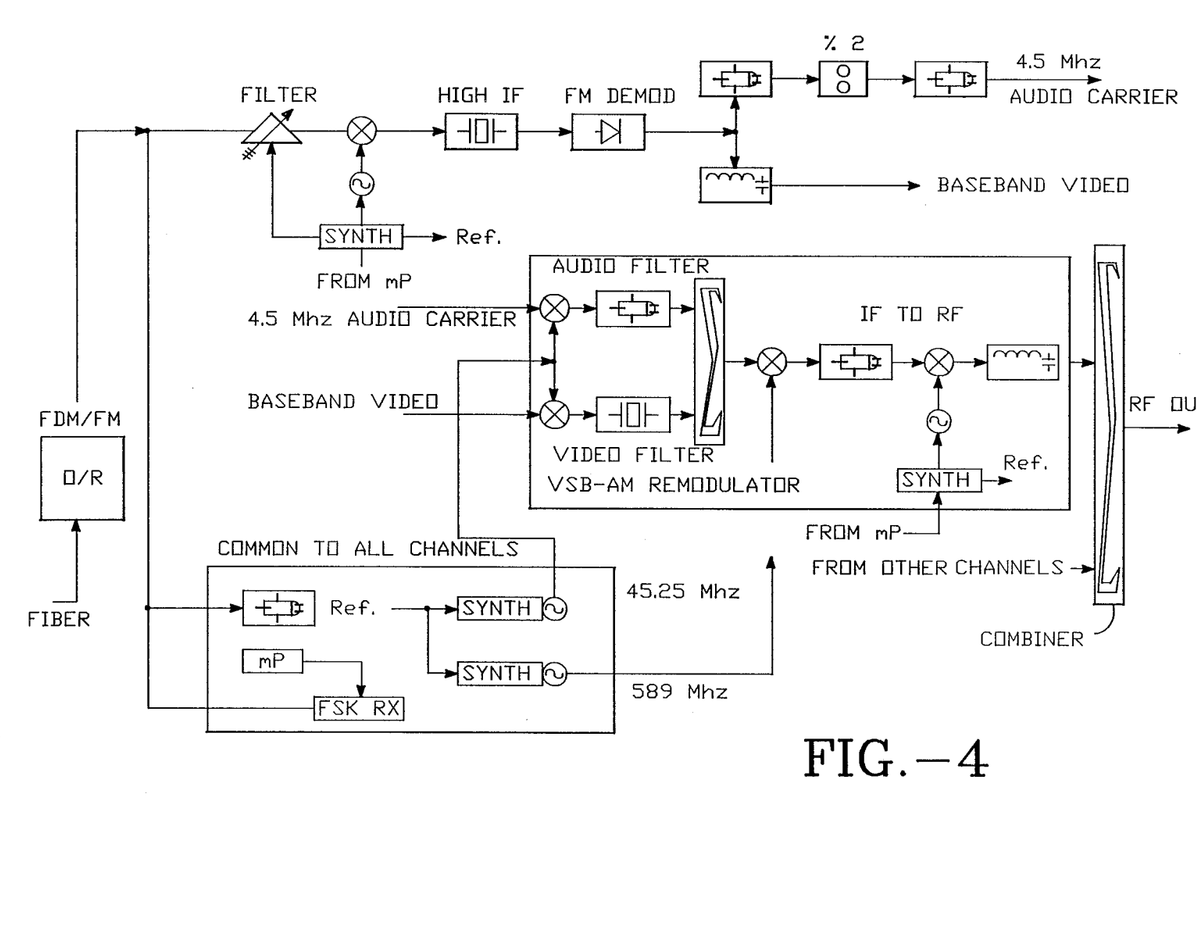
FIG. 4 depicts a block diagram of a channel of a multichannel system according to the present invention.

The synthesizer for each FM input converter receives serial data over the internal bus and can change the local oscillator frequency upon command from the common microprocessor controller. Selectivity and adjacent channel rejection is accomplished with a narrow cavity or SAW IF filter. After FM demodulation, the baseband video is recovered with a lowpass filter. The audio carrier is filtered with a bandpass filter and divided by two to obtain a 4.5 MHz normal deviation audio carrier. This method achieves less interference between the video and the audio signals, makes it easier to separate them with simple filters and offers better noise immunity of the audio signals (due to their double deviation) as they are transmitted over the fiber. Also, carrying the audio as a subcarrier instead as a discrete carrier alongside the video carriers makes it insensitive to phase noise in the headend output conversion and hub input converter circuits.

Once the baseband video and the 4.5 MHz audio carriers are recovered, they are remodulated for transmission over the coaxial cable as shown in the bottom half of FIG. 4.

The baseband video is passed through clamping and video processing circuits and AM modulated with a 45.75 MHz carrier signal to a standard video IF frequency (45.75 MHz). The 4.5 MHz audio carrier is upconverted with the same 45.75 MHz carrier signal to form the standard audio IF frequency (41.25 MHz). The audio IF carrier is band-pass filtered (to clean the unwanted byproducts of the conversion) and combined with the video carrier. The composite IF signal is then filtered with a VSB SAW filter to form the composite VSB-AM IF frequency. Then the composite IF frequency is upconverted to the required RF frequency by way of a double conversion IF to RF converter. The first conversion uses a common to all channel high frequency carrier signal (589 MHz) and converts the composite IF frequency to high IF frequency (634.75 MHz) where most of the signal gain and channel selectivity is accomplished. Then the final conversion is performed from this high IF frequency to the desired RF carrier frequency with a synthesized oscillator which receives the data and commands from the hub microprocessor controller over the internal bidirectional serial bus. Each channel card has a unique address associated with it. Upon address identification, the received data is downloaded to the synthesizers registers or control D/A registers. To determine the status of each channel, a polling sequence is initiated by the microprocessor and the content of the status registers (input synthesizer, output synthesizer, FM demod and AM remod RF output) are transmitted back to the microprocessor and out to a remote location over the bidirectional RS-232 port hooked to it.

The synthesized local oscillator for the output converter uses either the 4 MHz global reference signal received or a local 4 MHz reference carrier locked to a local source. This method permits phase locking of an individual AM output channel to a local channel (or to a comb generator) and reduces the interference from this strong local source to a minimum.

In addition, there are instances where all (or almost all) output frequencies must be offset by small amounts (12.5 KHz) to meet FCC Dockets requirements. This can be done globally or individually for all channels by offsetting the 589 MHz oscillator frequency (common to all the channels) by the required amount. Then a combination of global/local channel offsetting can provide any frequency plan desired and satisfy any regulatory requirements at the same time.

Each incoming video carrier is FM demodulated and then VSB-AM remodulated in an identical manner. All of the output VSB-AM video carriers and audio carriers are then combined to form one broadband output signal that can then be distributed over the conventional coaxial trunks.

To reduce the size, increase the efficiency and reliability and reduce the cost of the system, subsystems common to all of the channels in the system are concentrated in one common system block. This block is made of:

(1) 45.75 MHz local oscillator (used in all VSB-AM modulator sections), (2) 589 MHz local oscillator (used in all VSB-AM to RF converters), (3) 4 MHz global reference carrier receiving circuits, (4) FSK receiver for receiving downloadable commands and data, (5) microprocessor with standard RS-232 interface for processing of the data or commands received and controlling the individual channel characteristics such as frequency mapping (on the FM side or the AM side) or RF output power on or off.

The common 45.75 MHz and 589 MHz are synthesized and use the global 4 MHz reference received over the fiber. The microprocessor can receive data either locally from an RS-232 port or remotely from the output of the FSK receiver. The microprocessor communicates with the Hub channel cards over the internal bidirectional serial bus.

(b) Signals are transmitted in the scrambled mode

Figure 5A:
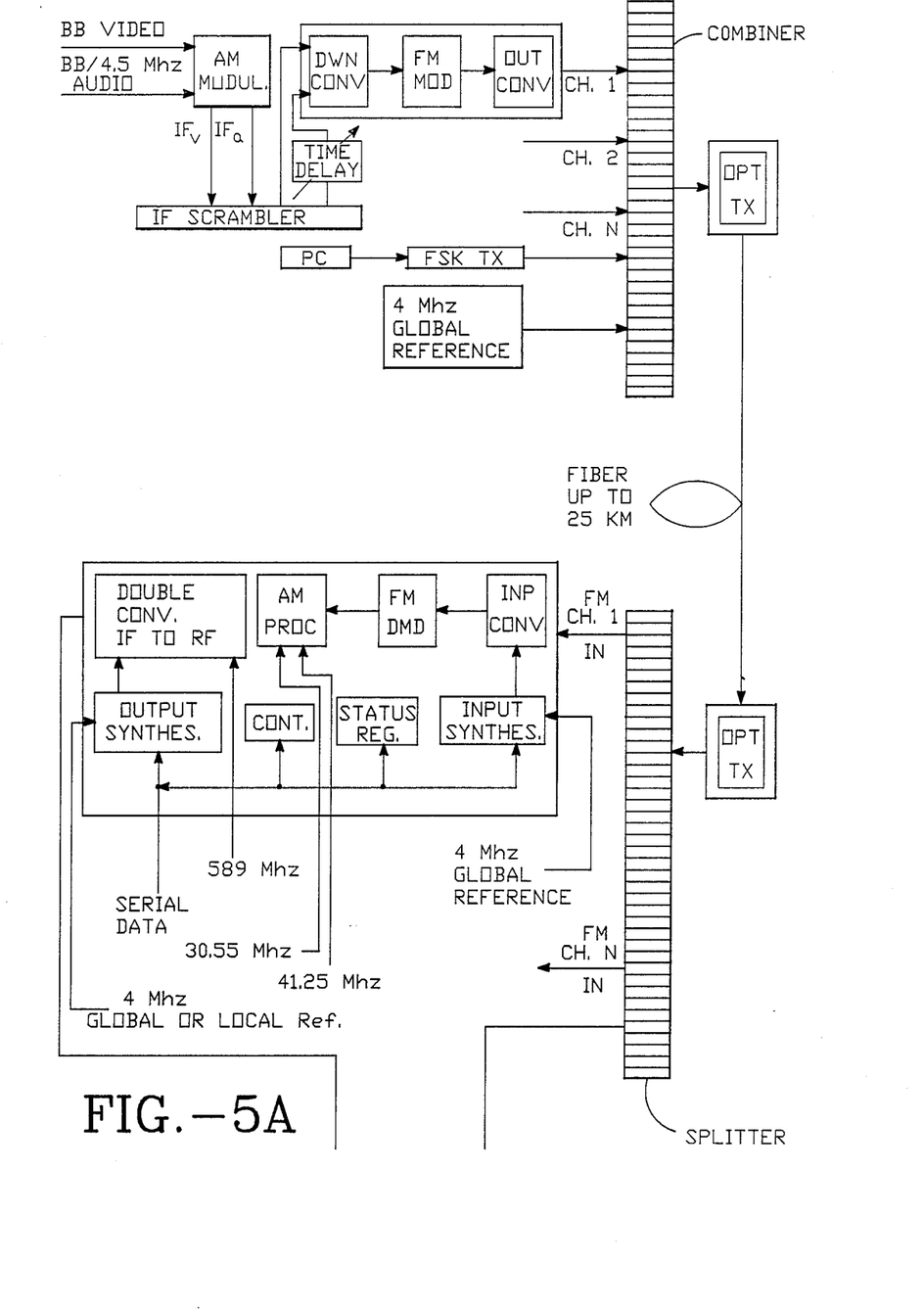
FIG. 5 depicts a diagram of a CATV trunk for scrambled signals.
Figure 5B:
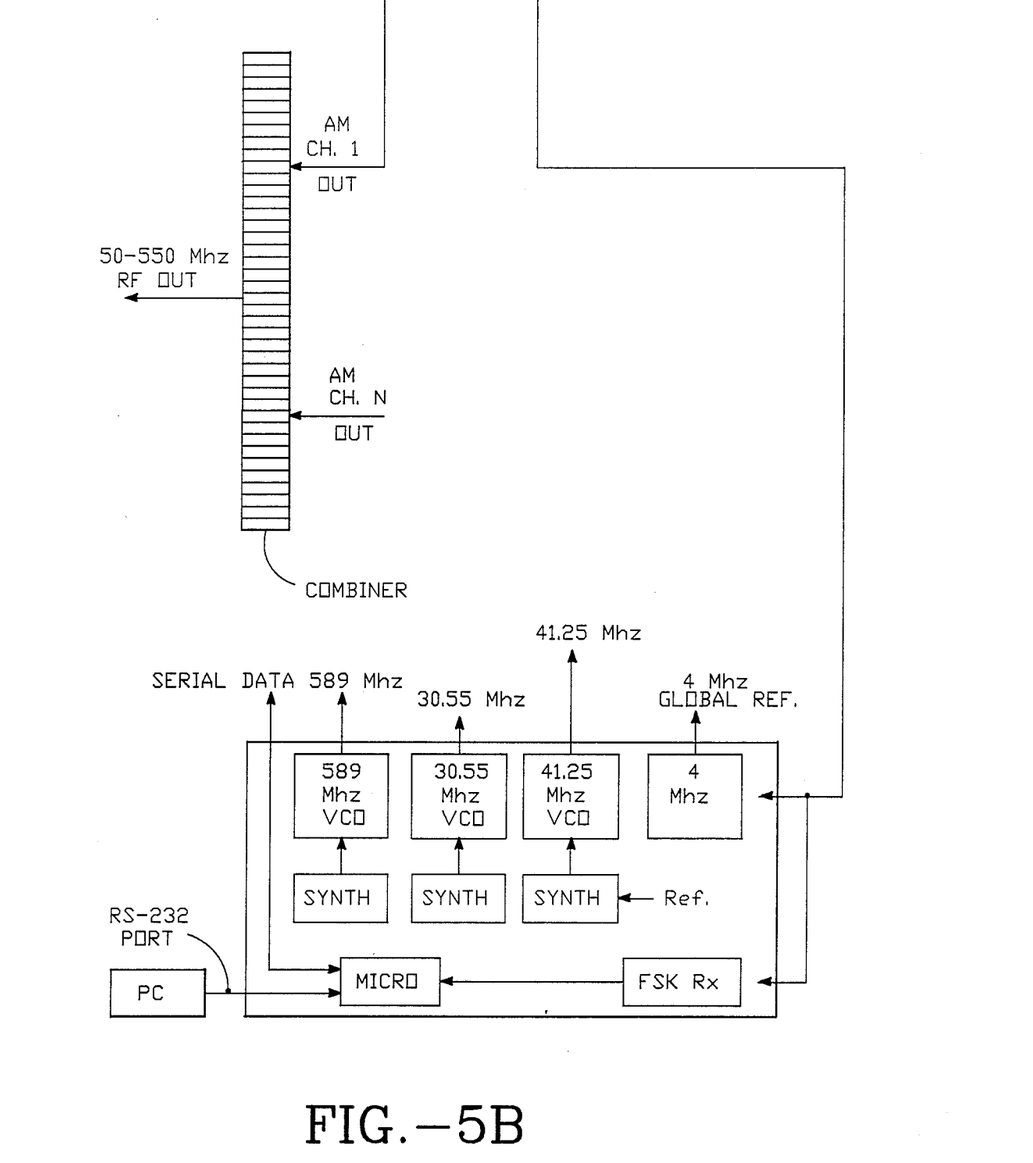
Figure 6:
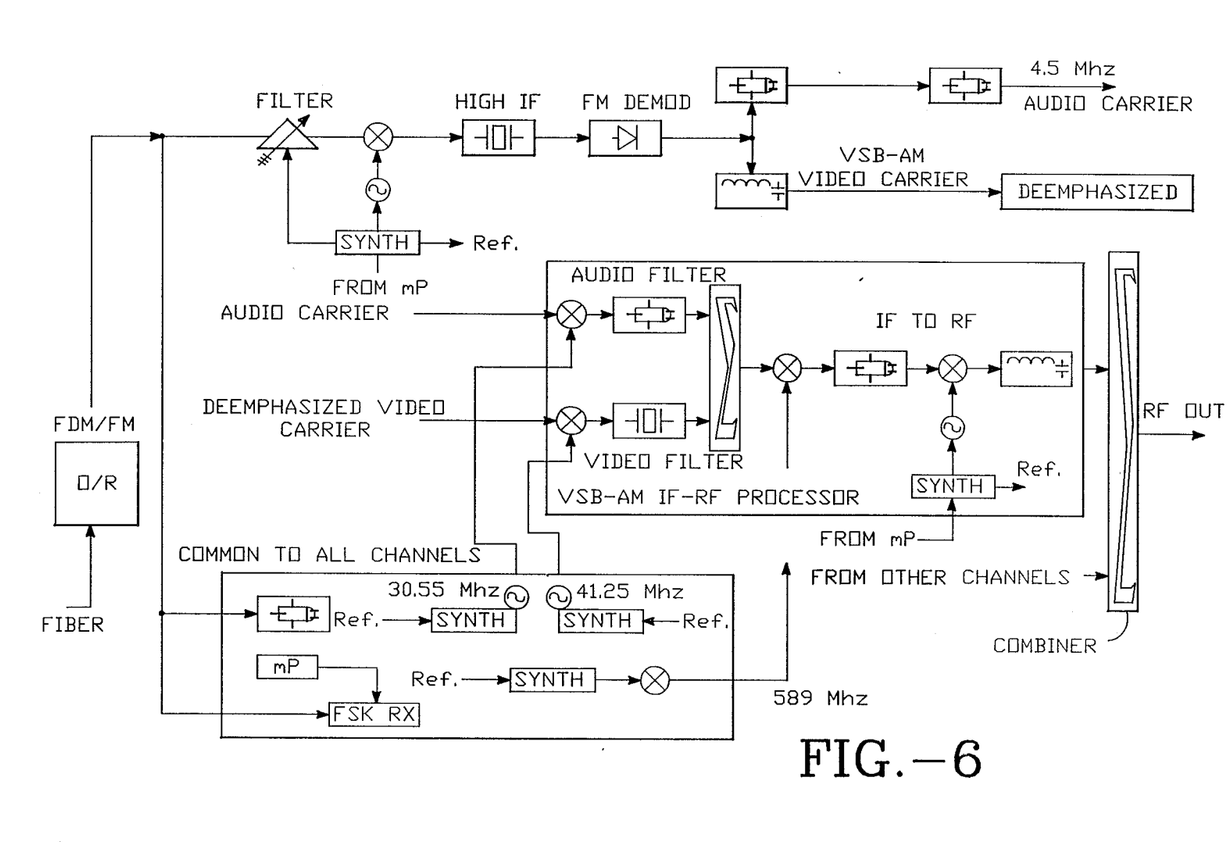
FIG. 6 depicts a diagram of a demodulator for scrambled signals according to the present invention.

The block diagrams of a headend to Hub trunk are shown in FIGS. 5 and 6. At the headend, the inputs are baseband video and either baseband audio or 4.5 MHz FM-modulated audio. This time, however, they modulate a VSB-AM modulator in the conventional way. The VSM-AM modulator video and audio IF output signals (45.75 MHz and 41.25 MHz) are now hooked up through an IF scrambler which produces scrambled IF video and audio carrier signals from the incoming clear video and audio carriers (and in some cases baseband video inputs would be necessary). The descrambling and set-top converter control information is transmitted along with the video or incorporated with the audio in various ways: the most common method is to be carried as an AM-modulated signal on the audio carrier. Other means include use of vacant lines in the VBI or HBI portions of the baseband video signal, use of subcarrier alongside the video or audio carrier, etc. The composite in-band scrambled video, audio and descrambling information is now present in the scrambled video and audio carriers, and in conventional CATV trunking applications, it would be converted from IF to RF frequency for transmission over the coaxial cable-based trunks.

In order to transmit this scrambled signal over a fiber based CATV trunk where FM modulation must be used for transparent delivery of the signals, further processing of the signals is required. The 45.75 MHz scramble video carrier is mixed with a 41.25 MHz locally generated carrier to a 4.5 MHz video subcarrier frequency. The 4.5 MHz video carrier is pre-emphasized with a filter which has constant impedance in both the passband as well as in the stopband portions of its frequency response and special transfer function characteristics. The 4.5 MHz video carrier and the 920 KHz chroma subcarrier are attenuated before FM modulation by 20 db and 15 db respectively. The audio carrier is mixed with a 30.55 MHz locally generated carrier to a 10.7 MHz audio subcarrier frequency. The composite signal 4.5 MHz pre-emphasized video and 10.7 MHz audio subcarriers are FM modulated at an IF frequency. Again, carrying both the video and the audio as subcarriers make them insensitive to phase noise at any point where there is a frequency conversion involved and the local oscillators phase noise is no longer critical. The IF is then converted to the desired RF frequency by a conventional output converter. The other scrambled channels are processed in an identical way. The composite FM RF signal then intensity modulates the optical transmitter. As with the clear signal case, this ensures compatibility with existing supertrunking equipment.

At the hub site, the optical signals are detected and converted to a composite electrical signal. In an identical (to the clear case) way, the FM-modulated carrier is selected and downconverted by an input converter to a high IF frequency for FM demodulation.

The synthesizer for each FM input converter receives serial data over the internal bus and can change the local oscillator frequency upon command from the common microprocessor controller. Selectivity and adjacent channel rejection is accomplished with a narrow cavity or SAW IF filter. After FM demodulation, the audio carrier is filtered with a 10.7 MHz bandpass filter. The 4.5 MHz video carrier is filtered with a lowpass filter and then de-emphasized with an inverse pre-emphasis characteristic (video carrier is boosted by 20 db and the chroma carrier by 15 db). The de-emphasis filter is also a constant impedance filter and has the exact inverse frequency response of the headend pre-emphasis filter. In this process, the overall video performance is not degraded. However, significant improvements in carrier to noise and carrier to beat performance is achieved.

Following the de-emphasis, the video and audio carriers are upconverted with locally generated carriers (41.25 MHz and 30.55 MHz) to 45.75 MHz and 41.25 MHz respectively. Again, to maintain high accuracy in the conversion process, these carriers are synthesized in a common system block and locked to the global 4 MHz carrier signal transported over the fiber. The composite scrambled video and audio IF are then filtered by the VSB-AM SAW filter to remove the undesired mixing byproducts and provide the necessary shape.

Just as in the cases of clear signals, the composite IF frequency is upconverted to the required RF frequency by way of a double conversion IF to RF converter. First conversion uses a common to all channel high frequency carrier signal (589 MHz) and converts the composite IF frequency to high IF frequency (634.75 MHz) where most of the signal gain and channel selectivity is accomplished. Then the final conversion is performed from this high IF frequency to the desired RF carrier frequency with a synthesized oscillator which receives the data and commands from the hub microprocessor controller over the internal bidirectional serial bus. Each channel card has a unique address associated with it. Upon address identification, the received data is downloaded to the synthesizers registers or control D/A registers. To determine the status of each channel, a polling sequence is initiated by the microprocessor and the content of the status registers (input synthesizer, output synthesizer, FM demod and VSB-AM RF output) are transmitted back to the microprocessor and out to a remote location over the bidirectional RSS-232 port hooked to it.

The synthesized local oscillator for the output converter uses either the 4 MHz global reference signal received or a local MHz reference carrier locked to a local source. This method permits phaselocking of an individual AM output channel to a local channel (or to a comb generator) and reduces the interference from this strong local source to a minimum.

In addition, there are instances where all (or almost all) output frequencies must be offset by a small amount (12.5 KHz) to meet FCC Dockets requirements. This can be done globally for all channels by offsetting the 589 MHz oscillator frequency (common to all the channels) by the required amount. Then a combination of global/local channel offsetting can provide any frequency plan desired and satisfy any regulatory requirements at the same time.

Each incoming video carrier is FM demodulated, and the demodulated 4.5 MHz VSB-AM video carriers and 10.7 MHz audio carriers are upconverted in an identical manner. All of the output VSB-AM video carriers and audio carriers are then combined to form one broadband output signal that can then be distributed over the conventional coaxial trunks.

To reduce the size, increase the efficiency and reliability and reduce the cost of the system, subsystems common to all of the channels in the system are concentrated in one common system block. This block is made of:

(1) 41.25 MHz local oscillator (used in all 4.5 Mhz to 45.75 MHz video upconversion), (2) 30.55 MHz local oscillator (used in all 10.7 MHz to 45.75 MHz audio carrier upconversion), (3) 589 MHz local oscillator (used in all VSB-AM IF to RF conversions), (4) 4 MHz global reference carrier receiving circuits, (5) FSK receiver for receiving downloadable commands and data, (6) a microprocessor with standard RS-232 interface for processing of the data or commands received and controlling the individual channel characteristics such as frequency mapping (on the FM side or the AM side) or RF output power on or off.

The common 41.25 MHz, 30.55 MHz and 589 MHz are synthesized and use the global 4 MHz reference received over the fiber. Since a 45.75 MHz local oscillator is used for VSB-AM modulation when clear signals are transmitted, a practical common system block will include all the oscillators, and the differentiation will be done by the actual scrambled or clear card layout and mechanical implementation.

The microprocessor can receive data either locally from an RS-232 port or remotely from the output of the FSK receiver. As before, it can communicate with the Hub channel cards over the internal bidirectional serial bus.

Other Hub Cards:

In certain areas there is a need to phaselock the VSB-Am output of the Hub to either a strong off-air signal or to a comb generator. A phaselocking card can be used with either clear or scrambled cards. Another card is a controller card common to all the hub channels.

Block Diagram of Hub-Based CATV Trunk With Phaselocking

Figure 7A:
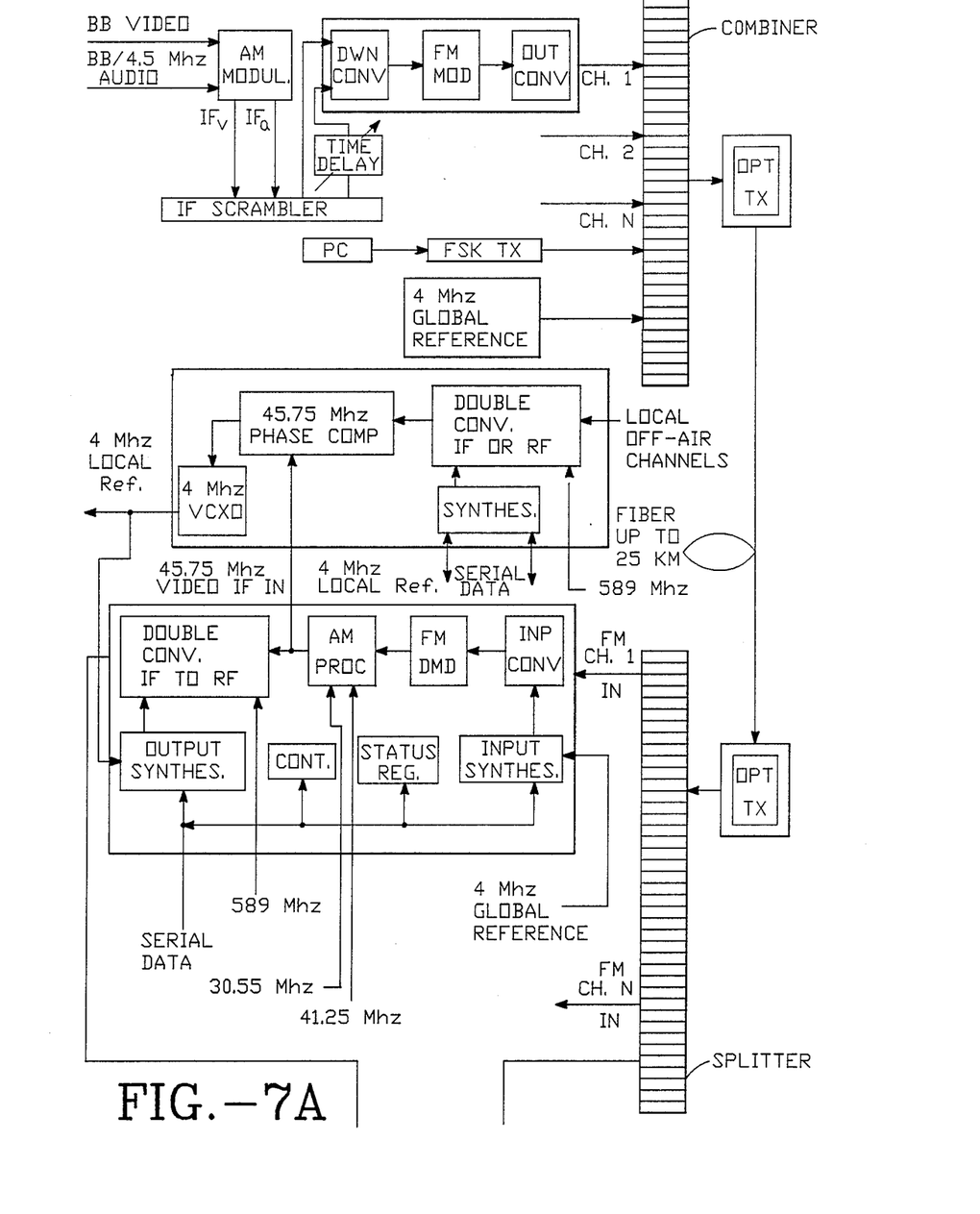
FIG. 7 depicts a diagram of phase locking to an off-air channel.
Figure 7B:
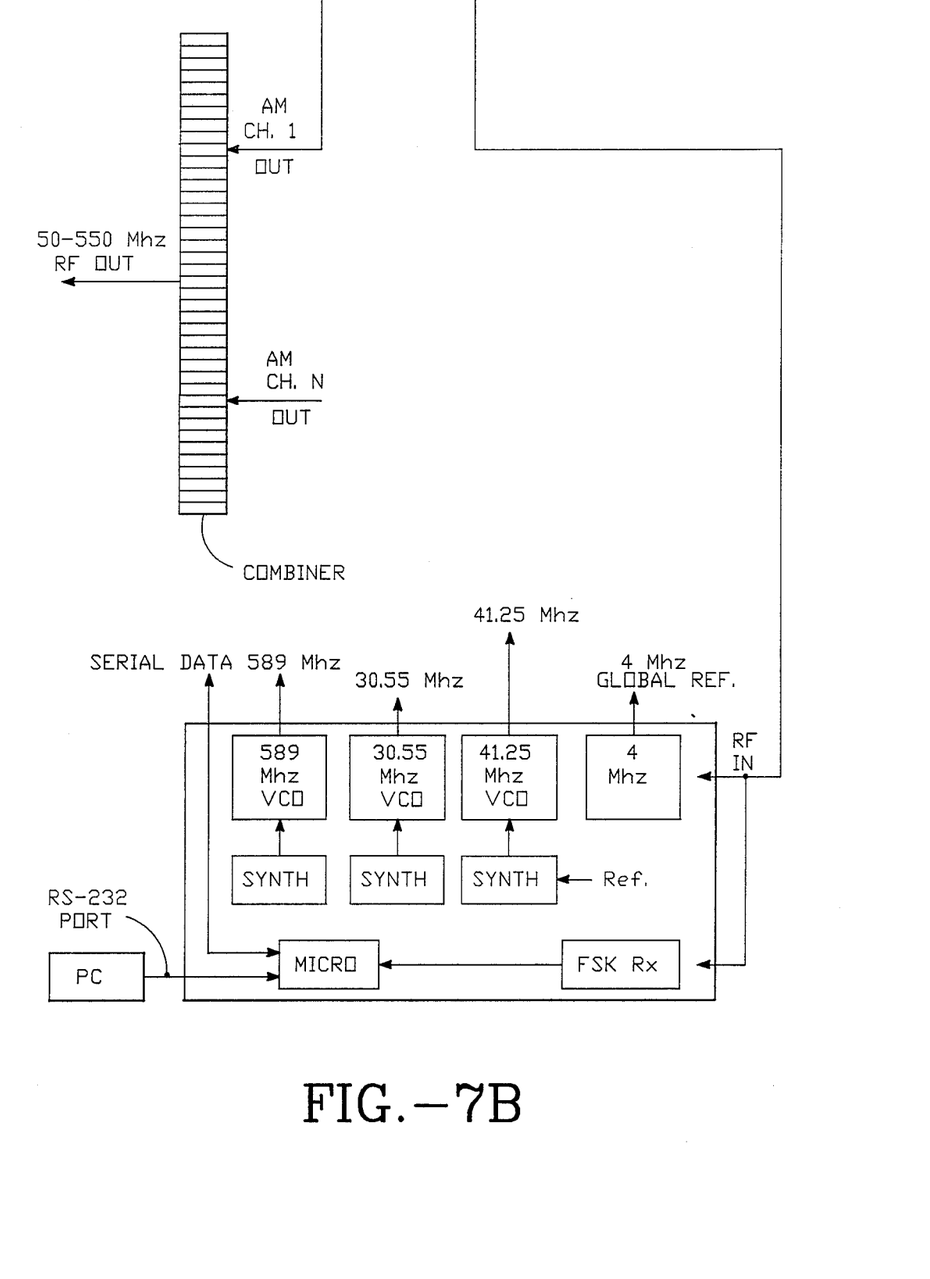

Individual channel phaselocking of a Hub channel is shown in FIG. 7. Individual channels can be phaselocked to an off-air source by comparing the IF frequency of the Hub channel to the IF frequency of a downconverted off-air channel. The down conversion is done with the same IF to RF converter used in an individual channel (except the signal flow is now reversed). The phaselock card downconverts to high IF frequency with a synthesized oscillator locked to a locally generated 4 MHz frequency. Then 589 MHz oscillator (locked to the global reference) further downconverts it to the video IF frequency (45.75 MHz) where it is compared to the Hub video IF. If there is frequency difference, the phase detector will generate an error voltage which will shift the frequency of the local 4 MHz reference oscillator. Since the input conversion of the phaselocking card synthesizer uses the local 4 MHz oscillator as its reference, its 45.75 MHz IF frequency will follow the 4 MHz oscillator until frequency lock has been accomplished. Since this same 4 MHz local oscillator is used as reference in the Hub output conversion, its output frequency will also follow the changes in the 4 MHz local oscillator and will therefore be locked to the off-air station as well.

Summary of Features and Capability Achievable With a Hub-based CATV Trunk:

(a) Optimum trading of bandwidth for signal to noise ratio-fiber optic links have a very large bandwidth capability. Using FM as a modulation technique offers over 30 db of processing gain and SNR improvement in exchange for larger channel bandwidths which can easily be accommodated by the fiber.

(b) Larger distances can be covered with fiber optic links without repeaters. This offers not only savings in maintenance, but has no radiation and offers bidirectional capabilities not easily achievable with coax-based trunks.

(c) Scrambled signals can now be transmitted over the fiber and converted to VSB-AM signals at the TransHub for transmission over the coaxial portion of the trunk. This keeps the bulky and complex headend scrambling equipment in one central location instead of spreading it over many hub locations as is done today. Using the approach developed for scrambled signals permits development of a universal hub device capable of handling NTSC, PAL, SECAM, or even HDTV signals without any significant modifications to the circuitry. The only one which will change will be the pre-emphasis/de-emphasis filter pair.

(d) The inherent heterodyne processing capabilities of the Hub permits it to link headends with different frequency plans. Until now, this was not possible without an exceedingly complex heterodyne frequency conversion at each headend.

(e) The evolution to a Hub-based trunk does not obsolete existing equipment and method of operation. The Hub is compatible with the existing 3000 FM supertrunking equipment. VSB-AM coaxial cable distribution trunks, headend modulators, BTSC audio and any scrambling scheme presently in use.

What is claimed is:

1. A cable television distribution trunk comprising:
   a hub,
   means for frequency modulating a clear baseband video signal and a first subcarrier FM modulated audio signal to form a clear multichannel signal,
   means for frequency modulating a scrambled subcarrier video signal and an audio signal to form a scrambled multichannel signal,
   means for transmitting said clear signal and said scrambled multichannel signal to said hub,
   means for frequency demodulating the multichannel signals at said hub, and
   means for converting the demodulated multichannel signals to amplitude modulated signals.

2. A trunk as in claim 1 including means for pre-emphasizing the baseband and subcarrier video signals and means for frequency modulating said audio signals to form a composite baseband signal.

3. A trunk as in claim 2 including means for frequency modulating said composite baseband signal at an intermediate frequency,
   means for converting said intermediate frequency signal to a radio frequency signal,
   means for combining said converted multichannel signals and said radio frequency signal to form a composite radio frequency video signal.

4. A trunk as in claim 3 including an optical transmitter which is intensity modulated by said composite signal to form an optical signal.

5. A trunk as in claim 4 wherein said hub includes means for receiving said optical signal, and means for recovering said audio and video signals.

6. A trunk as in claim 1 including means for pre-emphasizing said scrambled signal and means for frequency modulating said audio signals to form a composite scrambled signal.

7. A trunk as in claim 6 including means for frequency modulating said composite scrambled signal at an intermediate frequency to form an intermediate frequency signal,
means for converting said intermediate frequency signal to a radio frequency signal, and
means for combining said converted scrambled multichannel signals and said radio frequency signal to form a composite radio frequency video signal.

8. A trunk as in claim 7 including an optical transmitter which is intensity modulated by said composite signal to form an optical signal.

9. A trunk as in claim 8 wherein said hub includes means for receiving said optical signal, and means for recovering said audio signal and said video signal.

10. A trunk as in claim 1 including means for globally synchronizing said trunk.

11. A multichannel cable television trunk system comprising:
means for frequency modulating a baseband audio signal to form intermediate frequency (IF) audio signals,
means for amplitude modulating a baseband video signal to form intermediate frequency (IF) video signals,
means for scrambling said IF video and IF audio signals to form scrambled IF video and IF audio signals and control information therein,
means for mixing said scrambled IF signals with local oscillator signals to form composite video and audio subcarrier signals, and
means for frequency modulating said composite subcarrier signals.

12. In a cable television distribution trunk including a hub, the method comprising the steps of:
frequency modulating a clear baseband video signal and a first audio sub carrier signal to form a clear multichannel signal,
frequency modulating a subcarrier scrambled video signal and a second audio subcarrier signal to form a scrambled multichannel signal,
transmitting said clear signal and said scrambled multichannel signal to said hub,
frequency demodulating the clear and scrambled multichannel signals at said hub to form demodulated signals, and
converting the demodulated multichannel signals to amplitude modulated signals.

13. In a multichannel cable television trunk system, the method comprising the steps of:
frequency modulating a baseband audio signal and amplitude modulating a baseband video signal to form intermediate frequency (IF) video and audio signals,
scrambling said IF video and audio signals to form scrambled IF video and audio signals and control information therein, and
mixing said scrambled signals with local oscillator signals to form composite video and audio subcarrier signals, and
frequency modulating said composite subcarrier signals.

* * * * *